United States Patent [19]

Leinemann

[11] 3,835,403

[45] Sept. 10, 1974

[54] STEPWISE CURRENT ADJUSTING SYSTEM

[75] Inventor: Klaus Leinemann, Leopoldshafen, Germany

[73] Assignee: Siemens Aktiengesellschaft, Munich, Germany

[22] Filed: Sept. 18, 1972

[21] Appl. No.: 289,605

[30] Foreign Application Priority Data

Sept. 28, 1971 Germany............................ 2149106

[52] U.S. Cl.................. 328/186, 250/311, 307/227, 328/14, 328/228

[51] Int. Cl. ............................................ H03k 4/02

[58] Field of Search........... 328/74, 75, 14, 44, 130, 328/186, 228; 307/222, 227; 250/311

[56] References Cited

UNITED STATES PATENTS

| | | | |
|---|---|---|---|
| 3,271,688 | 9/1966 | Gschwind et al. | 328/155 X |
| 3,551,826 | 12/1970 | Sepe | 328/44 X |
| 3,657,657 | 4/1972 | Jefferson | 328/186 X |

*Primary Examiner*—John Zazworsky
*Attorney, Agent, or Firm*—Kenyon & Kenyon Reilly Carr & Chapin

[57] ABSTRACT

In an improved system for stepwise current adjustment, particularly adapted for adjusting the lens current of electron microscopes, a setting device for providing accurate voltage increments to the input of a control and regulating circuit for electromagnetic lenses includes a forward-and backward digital counter connected to the control means through a digital-to-analog converter. A shift register controlled by a backward counter connects counting signal inputs to the forward-and-backward counter via interlinking logic circuits to permit manual selection of a predetermined output from the setting device, corresponding to an assumed focus condition, followed by automatic stepwise variation of the setting device ouput through a selected range about the predetermined value.

6 Claims, 7 Drawing Figures

| | | | | | | | | | |
|---|---|---|---|---|---|---|---|---|---|
| $n =$ | 0 | 1 | 2 | 3 | 4 | 5 | 6 | 7 | 8 |
| $Z = 2^n =$ | 1 | 2 | 4 | 8 | 16 | 32 | 64 | 128 | 256 |

$\sum_{n=0}^{8} Z = 511$ (512 Current steps)

(a)

TRUTH TABLE FOR SETTING DEVICE 16

Assumed Conditions: Step Width = 1
Backward Counter Set Point = 4 (0100)
Initial Forward-Backward Counter Setting = 7 (0111)

| SYSTEM CONDITION | Shift Register 27 | | | | | Backward Counter 30 | | | | Forward-Backward Counter 17 | | | | |
|---|---|---|---|---|---|---|---|---|---|---|---|---|---|---|
| | $S_0$ | $S_1$ | $S_2$ | $S_3$ | $S_4$ | $B_3$ | $B_2$ | $B_1$ | $B_0$ | $A_8 .. A_3$ | $A_2$ | $A_1$ | $A_0$ | |
| Initial State | 1 | 0 | 0 | 0 | 0 | 0 | 1 | 0 | 0 | 0 | 0 | 1 | 1 | 1 |
| Start Pulse (Terminal 34) | 0 | 1 | 0 | 0 | 0 | 0 | 1 | 0 | 0 | 0 | 0 | 1 | 1 | 1 |
| Clock Pulse T1 | 0 | 1 | 0 | 0 | 0 | 0 | 0 | 1 | 1 | 0 | 0 | 1 | 1 | 0 |
| T2 | 0 | 1 | 0 | 0 | 0 | 0 | 0 | 1 | 0 | 0 | 0 | 1 | 0 | 1 |
| T3 | 0 | 1 | 0 | 0 | 0 | 0 | 0 | 0 | 1 | 0 | 0 | 1 | 0 | 0 |
| T4 | 0 | 1 | 0 | 0 | 0 | 0 | 0 | 0 | 0 | 0 | 0 | 0 | 1 | 1 |
| Shift Signal (Terminal 29) | 0 | 0 | 1 | 0 | 0 | 0 | 1 | 0 | 0 | 0 | 0 | 0 | 1 | 1 |
| Pulse From Generator 26 EA1 | 0 | 0 | 1 | 0 | 0 | 0 | 0 | 1 | 1 | 0 | 0 | 1 | 0 | 0 |
| EA2 | 0 | 0 | 1 | 0 | 0 | 0 | 0 | 1 | 0 | 0 | 0 | 1 | 0 | 1 |
| EA3 | 0 | 0 | 1 | 0 | 0 | 0 | 0 | 0 | 1 | 0 | 0 | 1 | 1 | 0 |
| EA4 | 0 | 0 | 1 | 0 | 0 | 0 | 0 | 0 | 0 | 0 | 0 | 1 | 1 | 1 |
| Shift Signal (Terminal 29) | 0 | 0 | 0 | 1 | 0 | 0 | 1 | 0 | 0 | 0 | 0 | 1 | 1 | 1 |
| Pulse From Generator 26 EA5 | 0 | 0 | 0 | 1 | 0 | 0 | 0 | 1 | 1 | 0 | 1 | 0 | 0 | 0 |
| EA6 | 0 | 0 | 0 | 1 | 0 | 0 | 0 | 1 | 0 | 0 | 1 | 0 | 0 | 1 |
| EA7 | 0 | 0 | 0 | 1 | 0 | 0 | 0 | 0 | 1 | 0 | 1 | 0 | 1 | 0 |
| EA8 | 0 | 0 | 0 | 1 | 0 | 0 | 0 | 0 | 0 | 0 | 1 | 0 | 1 | 1 |
| Shift Signal (Terminal 29) | 0 | 0 | 0 | 0 | 1 | 0 | 1 | 0 | 0 | 0 | 1 | 0 | 1 | 1 |
| Clock Pulse T5 | 0 | 0 | 0 | 0 | 1 | 0 | 0 | 1 | 1 | 0 | 1 | 0 | 1 | 0 |
| T6 | 0 | 0 | 0 | 0 | 1 | 0 | 0 | 1 | 0 | 0 | 1 | 0 | 0 | 1 |
| T7 | 0 | 0 | 0 | 0 | 1 | 0 | 0 | 0 | 1 | 0 | 1 | 0 | 0 | 0 |
| T8 | 0 | 0 | 0 | 0 | 1 | 0 | 0 | 0 | 0 | 0 | 0 | 1 | 1 | 1 |
| Shift Signal (Terminal 29) (Initial State) | 1 | 0 | 0 | 0 | 0 | 0 | 1 | 0 | 0 | 0 | 0 | 1 | 1 | 1 |

Fig. 4

STEPWISE CURRENT ADJUSTING SYSTEM

BACKGROUND OF THE INVENTION

This invention relates to current adjusting systems and, more particularly, to systems for stepwise adjustment of lens current in charged particle ray apparatus such as electron microscopes.

When using an electron microscope it is important to keep the intensity of the electron beam as low as possible because most specimens change their structure when irradiated by electrons, thus leading to inaccurate and non-reproducible results. These low intensity levels often produce poorly illuminated images on the screen that are difficult to evaluate visually. In such cases, it is customary to photographically record the images at relatively long exposure times. The resulting photographic print has the advantage of being brighter than the image projected on the screen as well as providing a permanent record. It is essential, however, that the electron beam be focused as sharply as possible in order to obtain a clear photograph.

In electron microscopes having electromagnetic lenses, the focus is changed by adjusting the lens current. Because poor image illumination makes it difficult to achieve the most accurate focusing current by visual inspection of the image screen, the normal procedure is to select a current value for the assumed best focus and then take a number of photographs at predetermined current increments about that value. One of the exposures should then be at the proper focus.

With present electron microscopes the entire procedure must be done by hand. First, the operator sets an objective lens current control to the assumed focus value, and then he reduces or increases the focusing current in small steps by means of a selector switch, while making a photographic recording at each step.

A proposed lens current control and regulating circuit includes a power amplifier controlled by a differential amplifier having two inputs, one a control voltage and the other a stable comparison voltage. The output of the power amplifier is connected in series with the lens focusing coil and a measuring resistor.

The control voltage input to the differential amplifier has three components, a coarse adjustment voltage, a fine adjustment voltage, and a regulating voltage. Coarse adjustment is provided by a potentiometer in a voltage divider network connected to a stabilized reference voltage, while a setting device such as a multiposition selector switch connecting a second resistance network provides fine voltage adjustment. The regulating voltage is obtained by inverse feedback from the measuring resistor and stabilizes the lens current during the extended periods of time required for photographic exposures. For example, it is often necessary to hold the absolute value of current fluctuations to within $10^{-5}$ to $10^{-6}$ of the total lens current.

It has also been proposed to substitute a digital counter, driving a digital/analog converter in place of the above multiposition switch and resistance network to provide a broad range of incremental adjustments with a minimum number of precision resistors. For example, a nine-bit binary counter feeding a nine-resistor digital/analog converter will provide a total of 512 (i.e., $2^9$) current steps.

An object of the present invention is to provide a setting device for a control and regulating circuit of the type described above to permit an assumed current value to be preset, followed by automatic stepwise variation of the current about the preset value.

It is another object of the invention to provide an automatically stepped setting device in which the shift from one step to the next is in response to a pulse synchronized with the operation of an image recording device such as a photographic camera.

These and other objects are achieved by a setting device that includes a forward-backward digital counter driving a digital/analog converter; at least one source of counting pulses; and switching means actuated by successive shift signals to selectively connect the counting pulses to the inputs of the forward-backward counter in sequential phases for: (*a*) setting a predetermined output value, (*b*) changing the output value by a predetermined first number of steps in one direction, and (*c*) changing the output value by a predetermined number of steps in the opposite direction.

The setting device of the invention further includes an adjustable counting means, such as a backward counter having its counting input connected in parallel to the counting inputs of the forward-backward counter and set to the predetermined number of steps for each switching phase, for providing a shift signal to the switching means after completion of the predetermined number of steps for each phase. Thus, the adjustable counting means and the switching means jointly determine a program for changing the output of the setting device and thereby the lens focusing current. The switching means determines the individual control phases (increasing current, or decreasing current), while the adjustable counting means determines the number of steps in each phase.

In a preferred embodiment, there are three pulse sources for maximum flexibility. The first pulse source is a manually-operated pulse generator that can be applied to either the forward or backward input of the forward-backward counter. The second pulse source is a clock device for producing a continuous series of pulses for rapidly changing the stepping device output to the starting value of an image recording series, and the third pulse source produces a single pulse in response to each operating cycle of an image recording device, such as a camera, to advance the forward-backward counter one step after each exposure.

A preferred switching means comprises a shift register and interlinking logic circuits for connecting the pulse sources to the inputs of the forward-backward counter in accordance with the programmed phase sequence. The shift register should have one stage for each sequential phase in a complete cycle for one series of image recordings. The recording of a focusing series is thereby automated to a high degree.

In addition to features already described, it is desirable to provide means for adjusting the amplitude of the individual steps produced in the output voltage of the setting device by the pulse applied to the counting inputs of the forward-backward counter.

Additional features and advantages of the invention will become apparent from the drawings and description of the preferred embodiment.

BRIEF DESCRIPTION OF THE DRAWINGS

FIG. 2(*a*) is a tabular illustration of the number of current steps provided by a nine-column binary counter coupled with a digital/analog converter.

FIG. 2(*b*) is a schematic diagram of a conventional digital/analog converter.

FIG. 2(*c*) is a plot of analog current output versus digital input (expressed in decimal notation) for the digital/analog converter of FIG. 2(*b*).

FIG. 2(*d*) is a table of the individual current components of each output current value corresponding to the digital inputs of FIG. 2(*c*).

FIG. 4 is a truth table for the setting device embodiment of FIG. 3.

DESCRIPTION OF THE PREFERRED EMBODIMENT

Figure 1:
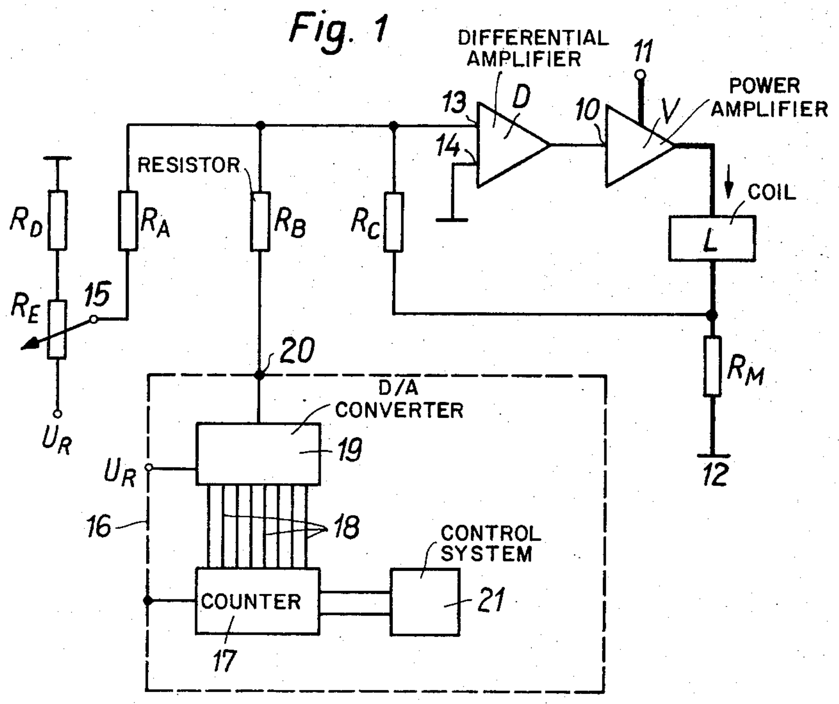
FIG. 1 is a block diagram of a control and regulating circuit for current flow to an electromagnetic lens coil.

Referring to FIG. 1, a control and regulating circuit for the lens coil current of an electron microscope is shown in order to illustrate the intended application of the setting device of the present invention. The control circuit comprises a differential amplifier D, the output of which is connected to the control input 10 of a power amplifier V. In the output circuit of amplifier V, a focusing coil L of an electromagnetic lens is connected in series with a measuring resistor $R_M$ across terminals 11 and 12 of a current source (not further shown). The differential amplifier D has an input 13 for a variable control voltage and an input 14 for a fixed comparison voltage.

The control voltage supplied to differential amplifier D consists of three components, a course adjustment voltage supplied via a resistor $R_A$, a fine adjustment voltage supplied via a resistor $R_B$, and a regulating voltage fed back from measuring resistor $R_M$, the three components being summed at input terminal 13.

A voltage divider comprising a fixed resistor $R_D$ and a variable resistor $R_E$ is connected to a stabilized reference voltage $U_R$, the resistance values of $R_D$ and $R_E$ being chosen with respect to $U_R$ to provide a coarse voltage adjustment at a terminal 15 which connects the pickoff arm of $R_E$ to resistor $R_A$.

Connected to resistor $R_B$ is a setting device 16 for making fine voltage adjustments in stepped increments. The major components of setting device 16 include a digital forward-backward counter 17 having outputs 18 which are connected to a digital/analog converter 19. The output terminal 20 of digital/analog converter 19 in turn is connected to resistor $R_B$. A control system 21, to be described in detail with reference to FIG. 3, supplies programmed pulses to the counting inputs of forward-backward counter 17.

In order to more clearly understand the operation of the setting device of the present invention, it will be helpful to discuss the relationship between inputs and outputs of a conventional digital/analog converter and a digital counter. For purposes of illustration a nine-bit counter will be assumed, although it will be apparent that any size counter can be chosen depending upon the desired total count capacity.

A typical digital forward-backward counter has both a forward and a backward counting input. A pulse applied to the forward counting input increases the output count by one, while a pulse applied to the backward counting input decreases the output count by one. Assuming the output is in straight binary form, the values of the bits in adjacent output channels differ by an integral power of two, with the first channel representing two to the zeroth power. Thus, as shown by FIG. 2(*a*), a nine-bit counter ($n$ equals 0 through 8) has a total count capacity of 512 steps.

Figure 2:
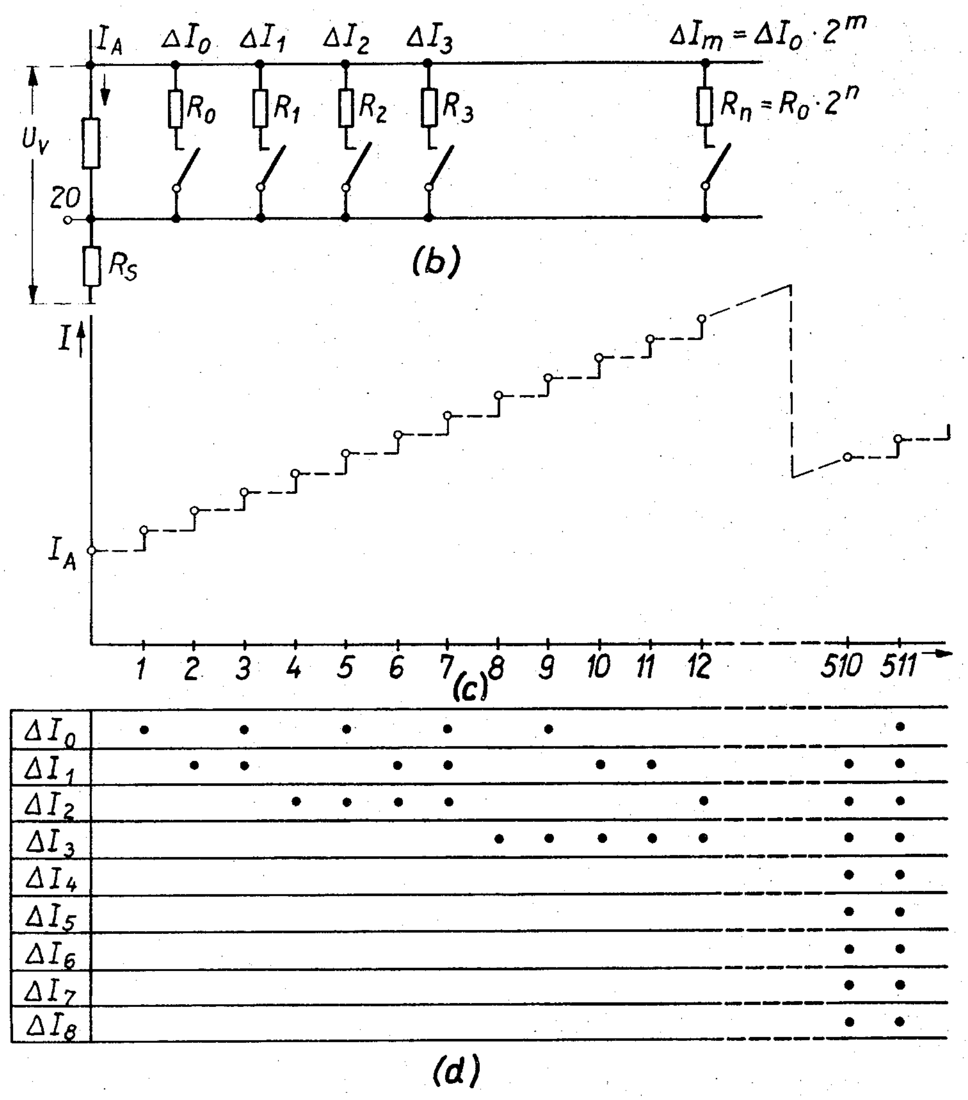
FIG. 2 illustrates the operating principle of a conventional digital/analog converter.

Referring to FIG. 2(*b*), a typical digital/analog converter comprises a group of resistors $R_o$, $R_1$, $R_2$, etc., connected in parallel, each resistor having a switch in series with it. Each switch is actuated by a corresponding output channel of a digital device such as forward-backward counter 17. For example, the switch for $R_o$ is shut if there is a one in the $n = 0$ output channel and is open if there is a zero; the switch for $R_1$ is shut if there is a one in the $n = 1$ output channel, and so forth.

The values of resistors $R_o$, $R_1$, $R_2$, etc. are in ratio of $1:2^n$, so that the resistance value of $R_n$ is equal to the value of $R_o$ multiplied by $2^n$. For a given voltage across the paralleled resistor circuits, the current through each closed circuit is inversely proportional to the value of the resistance. The sum of the currents through each leg flows through a summing resistor $R_S$ and is shown graphically in FIG. 2(*c*) as a function of the value of the binary number (expressed in decimal form) transmitted from the forward-backward counter. The resulting analog voltage appearing at output 20 of the digital/analog converter is therefore proportional to the value of the digital input. This can be checked in FIG. 2(*d*) in which the dots correspond to closed switches in the corresponding resistance legs of the converter. By reading the dots as ones in binary notation, it is apparent that they are equivalent to the corresponding points on the abscissa of FIG. 2(*c*) as expressed in decimal notation.

Figure 3:
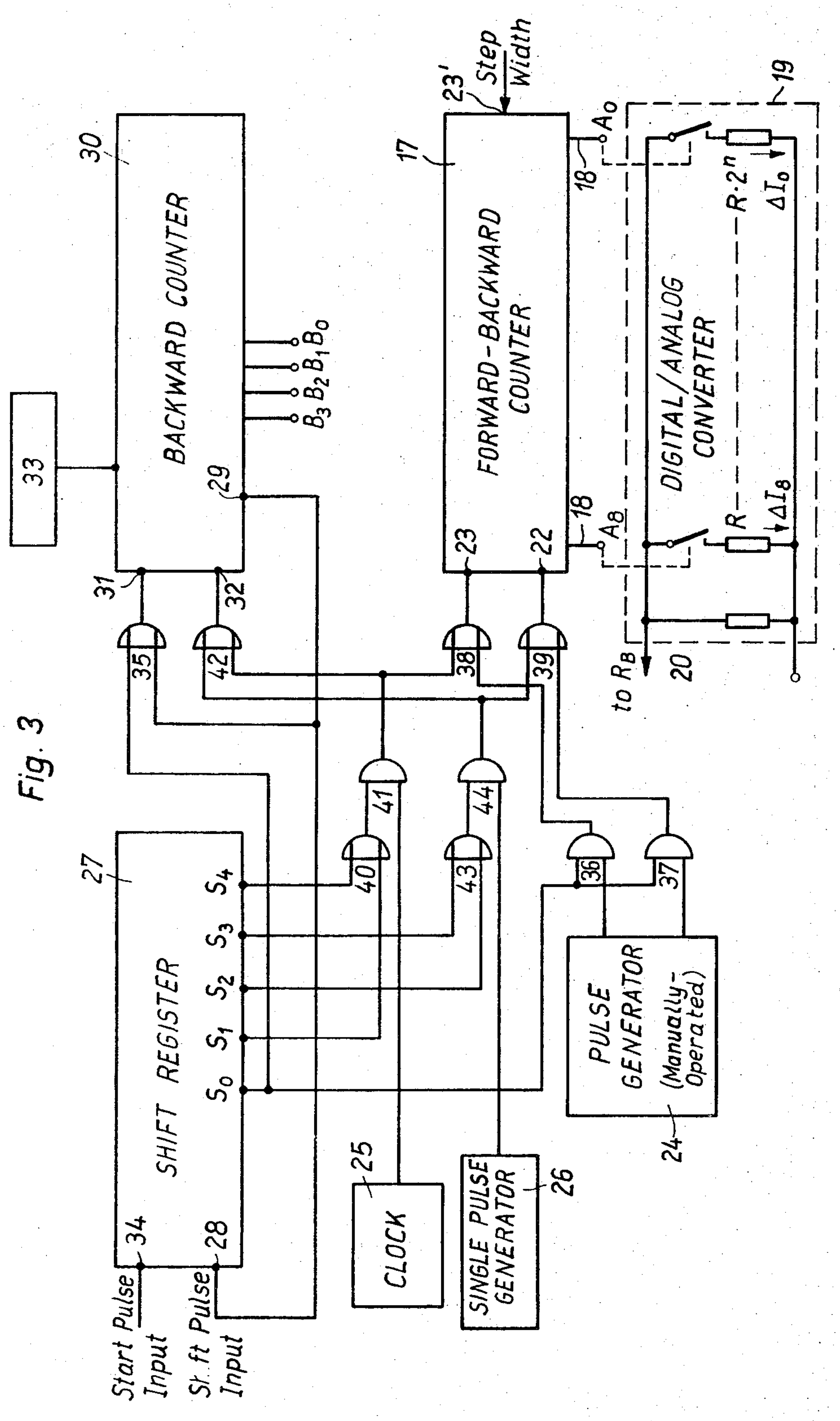
FIG. 3 is a block diagram of a preferred embodiment of a setting device for providing automatic stepwise adjustment of the control and regulating circuit of FIG. 1 according to the present invention.

Referring next to FIG. 3, a preferred embodiment of setting device 16 according to the invention is shown in more detail. As explained above, digital/analog converter 19 provides a voltage output at terminal 20 which is proportional to the total digital count of forward-backward counter 17. Counter 17 has a forward counting input 22 and a backward counting input 23, as well as an input 23' for controlling the step width.

Counting pulse sources, including a manually-controlled pulse generator 24, a clock 25, and a single pulse generator 26 actuated by the operation of an image recording device (not shown), are selectively connected to counting inputs 22 and 23 of forward-backward counter 17 by operation of a switching means that includes a shift register 27 and interlinking logic circuits. The operation of shift register 27 in turn is controlled by shift signals supplied to shift input 28 from an output terminal 29 of an adjustable counting device such as backward counter 30.

Backward counter 30 has a setting input 31 and a counting input 32. The instantaneous count appears in binary form at the counting output terminals $B_0$, $B_1$, $B_2$ and $B_3$. Each time the output count reaches zero, there is a shift pulse at output terminal 29. Upon counting down to zero, the backward counter can be reset by a pulse at input 31 to any number up to the limit of its capacity as predetermined by an adjusting control 33. A suitable counter which is adjustable to any number up to the limit of its capacity as predetermined by an adjusting control is disclosed in the Siemens publication "Halbleiter-Schaltbeispiele" (Semiconductor Switching Examples), 1969, pages 140 – 144.

Shift register 27 has outputs $S_0$, $S_1$, $S_2$, $S_3$ and $S_4$ that can be actuated in sequence either by a starting pulse signal at input 34 or by shift pulses at input 28. The electrical connections linking the shift register 27 to the other components of the setting device are as follows:

Shift register output $S_0$ is connected to setting input 31 of backward counter 30 through one input of an OR gate 35. $S_0$ is also connected to one input each of AND gates 36 and 37, the other inputs of which are connected to the output of pulse generator 24. The outputs of AND gates 36 and 37 in turn connect to counting inputs 23 and 22, respectively, of forward-backward counter 17 through one input each of OR gates 38 and 39.

Output terminals $S_1$ and $S_4$ of shift register 27 each connect to an input terminal of OR gate 40, the output of which leads to one of the inputs of AND gate 41. The other input terminal of AND gate 41 connects to the output of clock 25, and the output of AND gate 41 leads simultaneously to backward counting input terminal 23 of forward-backward counter 17 through the remaining input of OR gate 38 and to counting input 32 of backward counter 30 through one input of OR gate 42.

In a similar manner, terminals $S_2$ and $S_3$ of shift register 27 each connect to an input terminal of OR gate 43, the output of which leads to one of the inputs of AND gate 44. The other input terminal of AND gate 44 connects to the output of single pulse generator 26, and the output of AND gate 44 leads simultaneously to forward counting input terminal 22 of forward-backward counter 17 through the remaining input of OR gate 39 and to counting input 32 of backward counter 30 through the remaining input of OR gate 42. Thus, through its control over AND gates 36 and 37, 41, and 44, shift register 27 can selectively apply the outputs of pulse generator 24, clock 25, or single pulse generator 26 to the counting inputs of forward-backward counter 17 and, in the case of the latter two pulse sources, simultaneously to the counting input of backward counter 30.

As an example, one complete operating cycle of the setting device of FIG. 3 will be explained with the aid of a truth table shown in FIG. 4. In the example, step width control 24 of forward-backward counter 17 will be assumed to be set at one, and adjusting control 33 of backward counter will be set to provide four steps per shift signal.

In the system condition for the initial state, output $S_0$ of shift register 27 carries a one; the other outputs are all zero. In this state, AND gates 36 and 37 are enabled to transmit pulses from pulse generator 24 through OR gates 38 and 39 to backward and forward counting inputs 23 and 22, respectively, of forward-backward counter 17. It is understood, of course, that AND gates require a signal on both inputs to open, whereas a signal on either input will open an OR gate. Pulse generator 24 may be any type in which the number of output pulses can be controlled, either by preselection or by pressing a key for each pulse. It should be equipped with a selector switch (not shown) for choosing whether the pulses are to increase or decrease the count of forward-backward counter 24, depending on the desired initial focus current setting. With a nine-bit counter and a nine-resistor digital/analog converter, a total of 512 voltage steps are available for adjusting the fine control voltage input to the control and regulating device. For purposes of the example, the initial setting of forward-backward counter 17 will be chosen as 7 (0111 in binary notation) as shown in the righthand column of FIG. 4. At the same time, the initial setting of backward counter 30, as determined by adjustment control 33, is 4 (0100 in binary notation) as shown in the middle column of FIG. 4. The initial setting of backward counter 30 determines the range of negative and positive voltage steps in the image recording series to be taken about the initially chosen setting of forward-backward counter 17.

After the operator has established the assumed best focus current by manual operation of pulse generator 24 and set the desired range of negative and positive steps to be taken about that value by means of adjustment control 33, he initiates a start signal at terminal 34 of shift register 27, thereby shifting it one step. Output $S_0$ switches from one to zero, and output $S_1$ switches from zero to one; the other outputs remain at zero as shown in the first column of FIG. 4. The counts in the two counters are unchanged.

The change of output $S_0$ to zero shuts AND gates 36 and 37, thereby blocking pulse generator 24 from counting inputs 22 and 23 of forward-backward counter 17. At the same time, the change of output $S_1$ from zero to one enables AND gate 41 (via OR gate 40) to pass pulses from clock 25 simultaneously to backward counting input 23 of forward-backward counter 17 (via OR gate 38) and to counting input 32 of backward counter 30 (via OR gate 42). The pulse rate of clock 25 may be any convenient value; for example, the power line frequency of 50 or 60 $H_z$ can be used to drive a simple pulse generator circuit.

After four clock pulses (T1 through T4) the count in backward counter 30 reaches zero (0000), and the counter transmits a signal from terminal 29 to shift input 28 of shift register 27 (advancing the register another step) and also to setting input 31 via OR gate 35 (resetting the count of backward counter 30 to 4). Meanwhile, the same four clock pulses transmitted to the backward counting input 23 of forward-backward counter 17 have reduced its count to three (0011) with a resulting four-step decrease in the output voltage at terminal 20 of digital/analog converter 19.

Output $S_2$ of shift register 27 is now switched to one, with the other outputs all at zero. Thus, AND gate 41 is now shut, blocking the pulses from clock 25, but AND gate 44 is enabled by the connection to output $S_2$ via OR gate 43 to pass signals from single pulse generator 26 simultaneously to forward counting input 22 of forward-backward counter 17 (via OR gate 39) and to counting input 32 of backward counter 30 (via OR gate 42).

As described earlier, single pulse generator 26 is preferably actuated once for each operating cycle of an image recording device. For example, a pulse could be triggered by the film wind mechanism of a camera or by the shutter mechanism through a suitable delay line to ensure that the focusing current step will occur after completion of the exposure period.

After four pulses (EA1 through EA4) corresponding to four image recording exposures, the forward-backward counter 14 has been stepped back up to a count of 7 (0111), and backward counter 30 is down to zero, thereby producing another shift signal at terminal 29 to reset the count to four and to change shift register 27 another step.

Now the output $S_3$ exhibits a one, but since $S_3$ is connected to the other input of OR gate 43 there is no change in the condition of AND gate 44. Pulses from generator 26 continue to be fed to forward counting input 22 of forward-backward counter 17 and to counting input 32 of backward counter 30. After four more pulses (EA5 through EA8), the count of forward-backward counter 17 is up to 11 (1011), corresponding to four positive focusing current steps above the initially set value, and the count of backward counter 30 is down to zero.

The resulting shift signal from terminal 29 again resets the count of backward counter 30 to four and switches output $S_4$ of shift register 27 from zero to one. $S_4$ is connected via the other input of OR gate 40 to the input of AND gate 41, thereby again enabling pulses from clock 25 to pass to backward counting input 23 of the forward-backward counter 17 and to counting input 32 of backward counter 30. After four clock pulses (T5 through T8), the count of forward-backward counter 17 is reduced to 7 and the count of backward counter 30 to zero. A shifting pulse from terminal 29 then resets the count of backward counter 30 to four and switches output $S_0$ of shift register 27 from zero to one, thereby returning the system to its initial state.

From the foregoing example, it can be seen that the shift register 27 and backward counter 30 together with the interlinking logic circuits of the setting device of FIG. 3 determine a program for changing the voltage output of a setting device including a forward-backward counter 17 feeding a digital/analog converter 19. The shift register and logic circuits determine the stepping direction and the pulse source in the individual phases, while the setting of backward counter 30 determines the number of voltage steps in each phase. Furthermore, adjustment of the step width control input 24 to forward-backward counter 17 permits changing the amplitude of the individual voltage steps.

Although the focusing current range in the above example is symmetrical about the initial set point (four steps below and four steps above) it obviously would be possible to examine an asymmetrical range if desired by adjusting the set point of backward counter 30 to a different value for the phases controlled by shift register outputs $S_1$ and $S_2$ than for the phases controlled by outputs $S_3$ and $S_4$. Alternatively, two backward counters could be used, one connected to the output of AND gate 41 and the other to the output of AND gate 44.

If it is desired to take a focusing current series on only one side of an assumed initial focus value (say one deliberately chosen too low or too high), the circuit of FIG. 3 could be simplified by using a shift register with only three outputs instead of five. The second shift signal from terminal 29 would thus return the system to its initial condition, as is apparent from an inspection of the system condition between pulse $EA_4$ and $EA_5$ in FIG. 4.

As a result, by means of the setting device of the invention the procedure for taking a series of photographic exposures of specimen images generated in an electron microscope about an assumed focus with predetermined deviations is facilitated and can be carried out automatically with the disclosed preferred embodiment.

I claim:

1. In a setting device for providing a range of control voltages in incremental steps to the input of a control and regulating circuit for the lens current of an electron microscope, the setting device including a digital forward-backward counter having a forward counting input, a backward counting input and a digital output, a source of counting pulses for connection to the inputs of the counter for increasing or decreasing the value of the digital output, and a digital/analog converter connecting the output of the counter to the control input of the control and regulating circuit, the improvement comprising:

a. switching means having a shift signal input and actuated by successive shift signals applied to the shift signal input for selectively connecting predetermined numbers of the counting pulses to the forward and backward counting inputs of the forward-backward counter in sequential phases for
   i. changing the voltage value by a predetermined first number of steps in one direction during one phase and
   ii. changing the voltage value by a predetermined second number of steps in the opposite direction during another phase.

2. The setting device of claim 1 further comprising:

counting means having a counting input, the switching means selectively connecting counting pulses to the counting input in sequential phases, and an output connected to the shift signal input of the switching means for:
   i. transmitting a first shift signal to the switching means at the end of the one phase in response to the predetermined first number of counting pulses and
   ii. transmitting a second shift signal to the switching means at the end of the other phase in response to the predetermined second number of counting pulses.

3. The setting device of claim 2 further comprising:

a. a first source of continuous counting pulses, the first source being selectively connected to the counting input of the counting means and one counting input of the forward-backward counter during the one phase, and b. a second source of single counting pulses, each pulse produced in response to completion of an operating cycle of an image recording device, the second source being selectively connected to the counting input of the counting means and the other counting input of the forward-backward counter during the other phase.

4. The setting device of claim 3 wherein the switching means comprises:

a. a shift register having a first output activated during the one phase and a second output activated during the other phase;

b. a first AND gate having a first input connected to the first output of the shift register, second input connected to the first source of pulses, and an output connected to the counting input of the counting means and to one counting input of the forward-backward counter; and c. a second AND gate having a first input connected to the second output of the shift register, a second input connected to the second source of pulses, and an output connected to the counting input of the counting means and to the other counting input of the forward-backward counter.

5. The setting device of claim 2 wherein the counting means comprises a backward counter having a setting input connected to the shift signal output for setting the count of the backward counter to the predetermined first number in response to a shift signal initiating the one phase and for setting the count of the backward counter to the predetermined second number in response to a shift signal initiating the other phase.

6. The setting device of claim 5 wherein the backward counter includes an adjusting control for adjusting the value of the count set by the setting input.

* * * * *